US011790772B2

(12) United States Patent
Liu (10) Patent No.: US 11,790,772 B2
(45) Date of Patent: Oct. 17, 2023

(54) TRAFFIC LIGHT IMAGE PROCESSING (71) Applicant: BEIJING BAIDU NETCOM SCIENCE AND TECHNOLOGY CO., LTD., Beijing (CN)

(72) Inventor: Bo Liu, Beijing (CN)

(73) Assignee: APOLLO INTELLIGENT CONNECTIVITY (BEIJING) TECHNOLOGY CO., LTD, Beijing (CN)

(*) Notice: Subject to any disclaimer, the term of this patent is extended or adjusted under 35 U.S.C. 154(b) by 279 days.

(21) Appl. No.: 17/207,603

(22) Filed: Mar. 19, 2021

(65) Prior Publication Data

US 2021/0209378 A1 Jul. 8, 2021

(30) Foreign Application Priority Data

Sep. 23, 2020 (CN) .......................... 202011012702.3

(51) Int. Cl.
*G06K 9/00* (2022.01)
*G08G 1/01* (2006.01)
*G08G 1/097* (2006.01)
*G06V 20/54* (2022.01)
(Continued)

(52) U.S. Cl.
CPC ........... *G08G 1/0116* (2013.01); *G06V 20/46* (2022.01); *G06V 20/52* (2022.01); *G06V 20/54* (2022.01); *G08G 1/097* (2013.01)

(58) Field of Classification Search
CPC .. G05D 1/0033; G05D 1/0038; G05D 1/0044; G05D 1/0231; G05D 1/0214; G05D 1/0212; G06F 16/532; G06F 16/24578; G06F 16/5838; G06F 16/5866;
(Continued)

(56) References Cited

U.S. PATENT DOCUMENTS

2017/0084172 A1* 3/2017 Rolle ..................... G06N 20/00

FOREIGN PATENT DOCUMENTS

| CN | 103679733 A | 3/2014 |
| CN | 104574960 A | 4/2015 |
| CN | 109409301 A | 3/2019 |

(Continued)

OTHER PUBLICATIONS

Wu et al., "Hybrid LED Traffic Light Detection Using High-speed Camera," IEEE 19th International Conference on Intelligent Transportation Systems, 2016, 7 pgs.

*Primary Examiner* — Duy M Dang
(74) *Attorney, Agent, or Firm* — Mauriel Kapouytian Woods LLP; Michael Mauriel; Wensheng Ma (57) ABSTRACT

A traffic light image processing method and device, a computer system, a roadside device, and a storage medium are provided. The method includes: acquiring image data of a traffic light from a roadside sensor, the image data of the traffic light including a sequence of image frames over time, and the traffic light including at least two light heads; performing difference processing on two temporally adjacent image frames to obtain a difference image, a pixel value of each pixel point of the difference image being equal to a difference value of corresponding pixel points of the two temporally adjacent image frames; performing thresholding processing on the difference image to obtain a thresholding processed difference image; and determining a switched-on light head in the traffic light based on the thresholding processed difference image.

18 Claims, 3 Drawing Sheets

(51) Int. Cl.
*G06V 20/40* (2022.01)
*G06V 20/52* (2022.01)

(58) Field of Classification Search
CPC ........ G06T 7/00; G06V 20/54; G06V 20/584;
G08G 1/097; G08G 1/0145
See application file for complete search history.

(56) References Cited

FOREIGN PATENT DOCUMENTS

| | | | |
|---|---|---|---|
| CN | 109949593 | A | 6/2019 |
| CN | 110532903 | A1 | 12/2019 |
| EP | 3 144 918 | A1 | 3/2017 |
| EP | 3 618 033 | A1 | 3/2020 |
| JP | 2006072912 | A | 3/2006 |
| JP | 2008158913 | A | 7/2008 |
| JP | 2017091291 | A | 5/2017 |
| JP | 2020052475 | A | 4/2020 |
| WO | 2008038370 | A1 | 4/2008 |
| WO | 2014115239 | A1 | 7/2014 |
| WO | 2019079941 | A1 | 5/2019 |
| WO | 2020038699 | A1 | 2/2020 |

\* cited by examiner

TRAFFIC LIGHT IMAGE PROCESSING

CROSS-REFERENCE TO RELATED APPLICATION

This application claims priority to and benefits of Chinese Patent Application No. 202011012702.3, filed on Sep. 23, 2020. For various purposes, the entire content of the aforementioned application is incorporated herein by reference.

TECHNICAL FIELD

The present disclosure relates to the field of intelligent transportation and automatic driving, and more particular to, a traffic light image processing method, a traffic light image processing device, a computer system, a roadside device and a computer readable storage medium.

BACKGROUND

Road environment perception in the intelligent vehicle infrastructure cooperative system is an important factor affecting vehicle driving. Traffic lights can enable vehicles to pass through the crossroad orderly and safely, which can greatly improve the traffic efficiency of the crossroad. Therefore, traffic light recognition is an important part of the intelligent transportation system.

SUMMARY

According to an aspect of the present disclosure, a method is provided. The method includes: acquiring image data of a traffic light from a roadside sensor, the image data of the traffic light including a sequence of image frames over time, and the traffic light including at least two light heads; performing difference processing on two temporally adjacent image frames to obtain a difference image, a pixel value of each pixel point of the difference image being equal to a difference value of corresponding pixel points of the two temporally adjacent image frames; performing thresholding processing on the difference image to obtain a thresholding processed difference image; and determining a switched-on light head in the traffic light based on the thresholding processed difference image.

According to another aspect of the present disclosure, a computer system is provided. The computer system includes: a processor and a memory for storing computer programs that, when executed by the processor, cause the processor to perform the method according to the present disclosure.

According to another aspect of the present disclosure, a non-transitory computer-readable storage medium is provided. The computer-readable storage medium stores computer program instructions that, when executed by a processor, cause the processor to perform the method according to the present disclosure.

BRIEF DESCRIPTION OF THE DRAWINGS

The drawings, which exemplarily illustrate embodiments and constitute a part of the specification, together with the text description of the specification, serve to explain exemplary implementations of the embodiments. The illustrated embodiments are for illustrative purposes only and do not limit the scope of the claims. Throughout the drawings, the same reference signs denote similar but not necessarily the same elements.

DETAILED DESCRIPTION

The present disclosure is described in further detail below with reference to the accompanying drawings and embodiments. It is to be understood that the specific embodiments described herein are for purposes of explanation, and are not for limiting the present disclosure. In addition, it should also be noted that, for ease of description, only portions related to the related disclosure are shown in the drawings.

It should be noted that embodiments of the present disclosure and features in the embodiments may be combined with each other without conflict. Unless the context clearly dictates otherwise, if the number of elements is not specially limited, there may be one element or more elements. Moreover, the numbering of the steps or functional modules in the present disclosure is used merely to mark various steps or functional modules, and is not used to limit the order in which the various steps are performed or the connection relationships between the various functional modules.

In the present disclosure, unless otherwise specified, the use of the terms 'first', 'second and the like to describe various elements is not intended to define the positional relationship, the timing relationship, or the importance relationship of the elements, and such terms are used only to distinguish one element from another element in the same embodiment.

In the related art, the method for recognizing traffic light mainly includes vehicle-mounted perception and roadside perception. Vehicle-mounted perception generally uses the vehicle-mounted camera to acquire video images in front of the vehicle, and then relies on information such as color and shape to detect the region of interest and extract features for category determination, thereby obtaining the state of the traffic light. Roadside perception is the technology that deploys sensors to the roadside and perceives the traffic light on the road. Compared with the vehicle-mounted perception, the roadside perception has the advantage that the viewing angle of the roadside sensor is fixed, such that the position of the traffic light does not need to be detected. The roadside sensor can send the state and time of the traffic light to the automated driving vehicle. To improve the capability for recognizing traffic lights, it is required to train the roadside sensor. In the training process, it is required to provide the roadside sensor with image data of various light colors that meet the proportion of approximate uniform distribution. To achieve the goal, a large number of traffic light images need to be screened and annotated.

Along with continuous maturity of the intelligent vehicle infrastructure cooperative technology, vehicle intelligence and traffic intelligence are inevitable trends of future development. The intelligent vehicle infrastructure cooperative system is an organic combination of roadside facilities and intelligent vehicles, and through intelligent roadside device, vehicle wireless communication, edge calculation and other technologies, dynamic real-time information interaction among people, vehicles, roads and backends can be realized. Active vehicle safety control and road coordination management are developed on this basis, and effective coordination of people, vehicles and roads can be realized.

Figure 1:
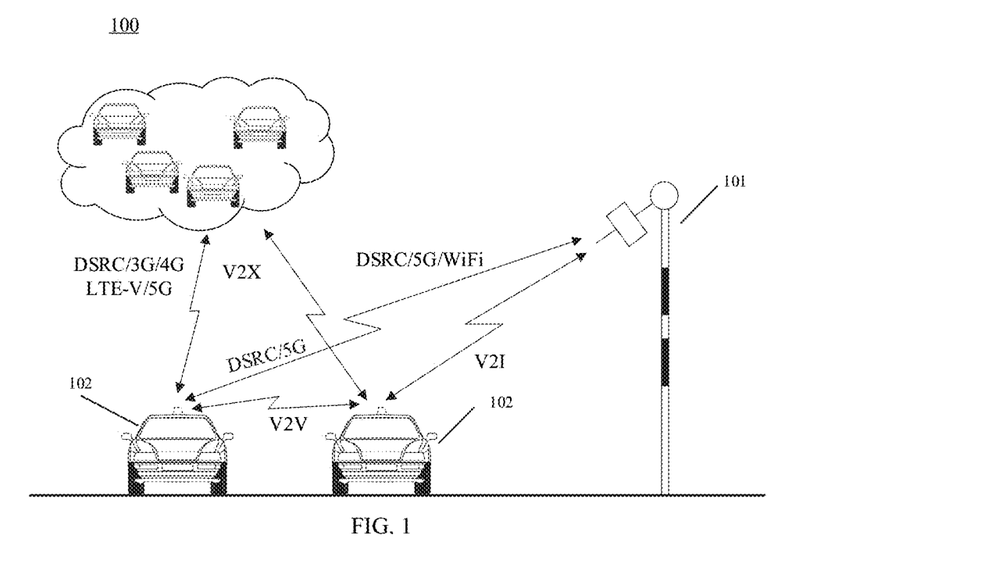
FIG. 1 is a schematic diagram illustrating an application scenario of a vehicle infrastructure cooperative system according to some embodiments of the present disclosure.

FIG. 1 is a schematic diagram illustrating an application scenario of a vehicle infrastructure cooperative system according to some embodiments of the present disclosure. Through various wireless communication manners, the vehicle infrastructure cooperative system shown in FIG. 1 forms a new traffic structure between vehicles, between vehicles and roads, between near-end vehicles and far-end vehicles, and even between people. The roadside device 101 in the vehicle infrastructure cooperative system refers to the device installed in the front end of the lane control system to acquire information, and it is usually installed on both sides of the road. The roadside device 101 can communicate with the vehicle-mounted terminal 102 in the short-distance communication mode to acquire the vehicle information. Specifically, the roadside device 101 includes a roadside perception device and a roadside computing device. The roadside perception device may also be referred to as a roadside sensor (such as a roadside camera) connected to the roadside computing device (such as a road side computing unit (RSCU)). The roadside computing device is connected to a server device. The server device can communicate with the automated driving or assisted driving vehicle in various ways. In another system architecture, the roadside perception device has the computing function, and in this case the roadside perception device can be directly connected to the server device. The above connections may be wired or wireless. The server device in the present disclosure may be, for example, a cloud control platform, a vehicle-road coordination management platform, a central subsystem, an edge computing platform, a cloud computing platform and the like.

The automated driving vehicle needs to recognize traffic lights when it passes through the crossroad. The roadside sensor can send the state and time of the traffic light to the automated driving vehicle. Thus, it is necessary to train the roadside sensor, to improve the ability of the roadside sensor to recognize the light color of the traffic light. To ensure the training effect, in the process of acquiring traffic light data, it is required to ensure that the images of various light colors meet the proportion of approximate uniform distribution. Although manual screening can ensure that the screened images meet the requirement of uniform distribution of light colors, the efficiency is low, and a large number of images cannot be rapidly screened.

Figure 2:
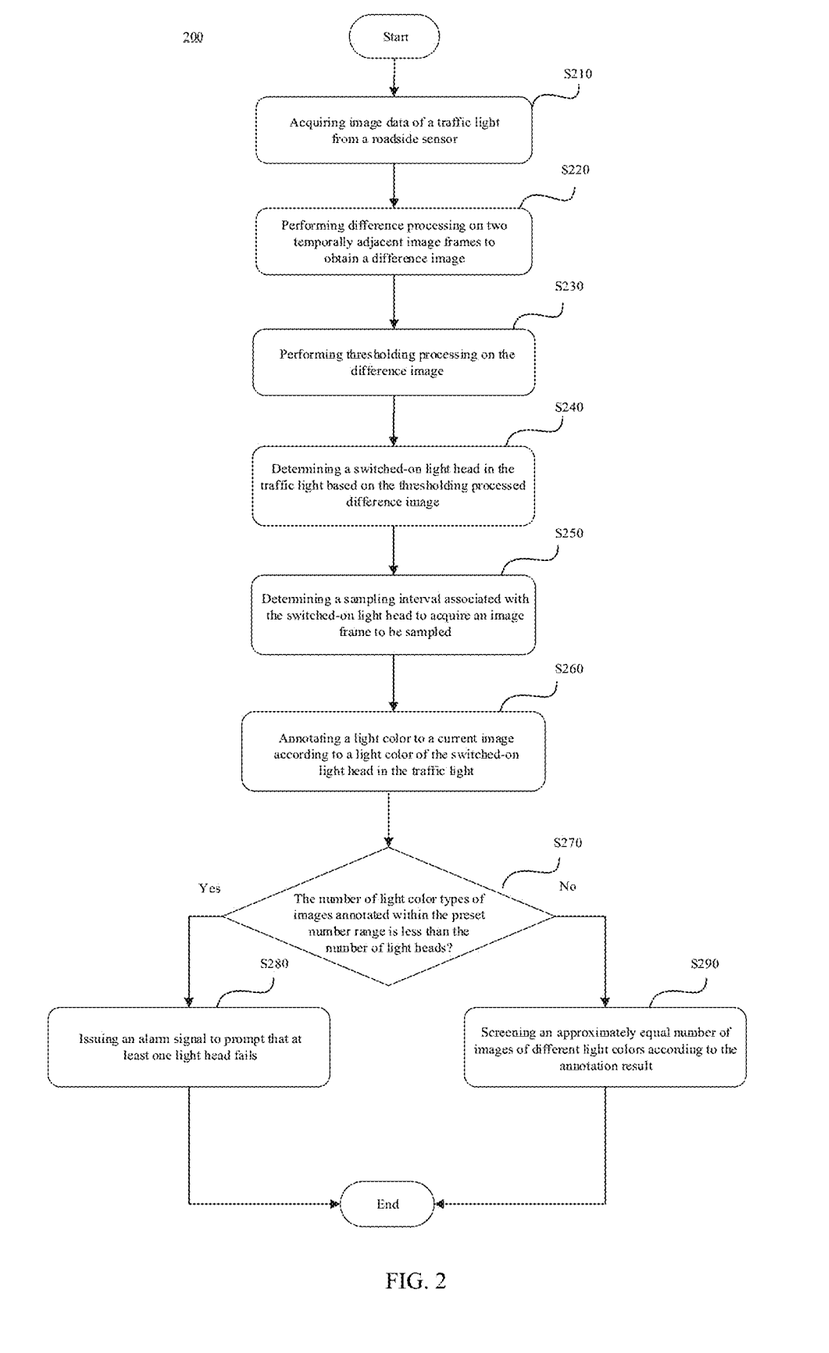
FIG. 2 is a flowchart illustrating a traffic light image processing method according to some embodiments of the present disclosure.

FIG. 2 is a flowchart illustrating a traffic light image processing method 200 according to some embodiments of the present disclosure. As shown in FIG. 2, the method 200 may include blocks S210-S240. At block S210, image data of a traffic light is acquired from a roadside sensor. The image data of the traffic light includes a sequence of image frames over time, and the traffic light includes at least two light heads. At block S220, difference processing is performed on two temporally adjacent image frames to obtain a difference image. The pixel value of each pixel point of the difference image is equal to a difference value of corresponding pixel points of the two temporally adjacent image frames. At block S230, thresholding processing is performed on the difference image. At block S240, a switched-on light head in the traffic light is determined based on the thresholding processed difference image.

Here, it should be noted that for the crossroad where the traffic light is perceived by computer vision, the roadside sensor is generally arranged on the light pole of the traffic light. Compared with host vehicle perception, roadside perception has the advantage that the viewing angle of the roadside sensor is fixed. Thus, the position of the traffic light can be predetermined and stored locally. In this way, in the process of light color recognition, the position of the traffic light does not need to be detected. In the actual traffic environment, the traffic light generally includes more than two light heads, such as a red light head, a green light head, and a yellow light head. It can be understood that, the image data of the traffic light acquired from the roadside sensor may be a sequence of temporally continuous image frames img_list. The light color can be screened by utilizing the timing sequence of the light color of the traffic light. However, due to the complexity of road condition information, the operating state of the traffic light varies greatly, and the recognition rate is poor when the light color of the traffic light of the obtained image is automatically recognized through the program.

Thus, the method according to the present disclosure detects the light color being currently switched on through inter-frame difference, thereby improving the accuracy of light color recognition. Specifically, for a traffic light in a certain direction, difference processing (img_list[1]-img_list[0]) is performed on two temporally adjacent image frames to obtain a difference image. The pixel value of each pixel point of the difference image is equal to the difference value of the corresponding pixel points of the two temporally adjacent image frames. Then, thresholding processing is performed on the difference image. The switched-on light head in the traffic light is determined based on the thresholding processed difference image. In this way, the switched-on light head in the traffic light can be quickly and accurately determined, and prepared for subsequent acquisition of the image data of the traffic light with the light color as uniformly distributed as possible.

According to some embodiments, performing the thresholding processing on the difference image includes: in response to a pixel value of a first pixel point of the difference image being greater than a first threshold, setting the pixel value of the first pixel point to a preset brightness value; and in response to a pixel value of a second pixel point of the difference image being not greater than the first threshold, setting the pixel value of the second pixel point to 0. It should be noted that 'difference' herein does not mean directly calculating the absolute value of the brightness to find the brightness change between the two image frames. Instead, for the pixel point with the pixel value being not greater than the first threshold thres_1 in the difference image, its pixel value is set to 0, and for the pixel point with the pixel value being greater than the first threshold thres_1 in the difference image, its pixel value is set to the preset brightness value (such as 255). In other words, it is merely required to detect the change from dark (0) to bright (255) of a certain light head. In brief, it is merely required to detect the light-on process, not the light-off process. Thus, the logic is simple, and has a certain robustness, which can ensure a certain recognition accuracy and greatly improve the detection efficiency. In fact, when the light color is not changed and merely the intensity is changed, it can be recognized that the light head is still in the same light color through the above method.

According to some embodiments, the method 200 may further include: determining the sampling interval associated with the switched-on light head to acquire an image frame to be sampled (block S250). In the present disclosure, no matter how many times a light head is detected to be switched on, it can be considered as the same switching on until the light head at other positions is detected to be switched on. Thus, by determining the range of the sampling interval, the image related to the light color of the switched-on light head can be cached. In the subsequent steps of screening and annotating the images, the image of the corresponding light color can be directly selected from the sampling interval, such that the subsequent screening and annotating operations can be facilitated, and the efficiency can be improved.

According to some embodiments, determining the switched-on light head in the traffic light includes: calculating the sum of pixel values of pixel points of each light head in the thresholding processed difference image to obtain a difference sum of each light head; normalizing the difference sum of each light head; and taking the light head with the maximum normalized difference sum as the switched-on light head. For example, the difference sum of each light in the thresholding processed difference image is calculated, the difference sum is divided by the number of pixel points n_pixel for normalization, and then the light head with the maximum difference sum (denoted as max_diff_sum_current) in the three light heads is found, and the light color thereof is obtained. Specifically, normalizing the difference sum of each light head may include any one of the following: dividing the difference sum of each light head by the number of pixel points n_pixel of the light head; dividing the difference sum of each light by the area of the light head; or dividing the difference sum of each light by the total area of the traffic light. Certainly, those skilled in the art can understand that the normalization manner is not limited to the above three cases described above. For example, it is also feasible to divide the difference sum of each light by other values associated with the light head.

According to some embodiments, determining the sampling interval associated with the switched-on light head includes: determining that a light color of the switched-on light head in the traffic light is switched, in response to the counted number of the switched-on light head not satisfying at least one of: the counted number of the switched-on light head being greater than a product of a third threshold of a corresponding light head and a second preset percentage; and the counted number of the switched-on light head being greater than a product of a counted number of at least one switched-off light and a second preset multiple; and determining the sampling interval as an interval between a current image frame and a latest image frame when it was determined that the light color was switched. It should be noted that the second threshold may be set to be relatively small, such that the brightness change in the image can be more convenient to obtain. In the embodiment, in addition to comparing the difference sum of the switched-on light head with its historical value (such as the second threshold), it may also be compared with the difference sum of other light colors, such that the error caused by accidental fluctuation of the brightness can be eliminated. For example, when the difference sum of the switched-on light head is greater than 80% of max_diff_sum (the second threshold) of the corresponding light color, and is greater than twice of the current difference sum of the other two light heads, the light color can be considered as the newly switched-on light color, otherwise, the next image frame is processed.

According to some embodiments, the second threshold is obtained by performing initialization processing on image data of the traffic light. Specifically, performing initialization processing on the image data of the traffic light includes: performing difference processing on two temporally adjacent image frames in the initializing period to obtain the difference image; performing thresholding processing on the difference image; determining the maximum difference sum of the switched-on light head in the traffic light based on the thresholding processing result; and setting the second threshold of the corresponding light head to be the maximum difference sum of the switched-on light head. For example, the difference sum of the difference image of each light head is calculated, and the light head with the maximum difference sum (denoted as max_diff_sum_current) in the three light heads is found, and the light color thereof is obtained. When the max_diff_sum_current is greater than max_diff_sum of the corresponding light color, max_diff_sum of the corresponding light color is set to be max_diff_sum_current.

According to some embodiments, the method 200 may further include: annotating a light color to a current image according to the light color of the switched-on light head in the traffic light (block S260); and screening the approximately equal number of images of different light colors according to the annotation result (block S270). In this way, the data with the light color being as uniformly distributed as possible can be obtained, manual pre-annotating is omitted, the data annotating process is accelerated, and the annotating cost is saved.

According to some embodiments, determining the switched-on light head in the traffic light includes: counting the number of pixel points set the preset brightness value in each light head; and taking the light head including the maximum number of pixel points set the preset brightness value as the switched-on light head according to the counted number of each light head. In this case, the related steps of calculating the difference sum and normalization in the foregoing embodiments may be omitted, and the computing resource can be saved.

According to some embodiments, determining the sampling interval associated with the switched-on light head includes: determining that the light color of the switched-on light head in the traffic light is switched, in response to the counted number of the switched-on light head not satisfying at least one of: the counted number of the switched-on light head being greater than the product of a third threshold of a corresponding light head and a second preset percentage; and the counted number of the switched-on light head being greater than the product of the counted number of at least one switched-off light and a second preset multiple; and determining the sampling interval as the interval between the current image frame and the latest image frame when it was determined that the light color was switched. It should be noted that, the third threshold may be set to be relatively small, such that brightness change in the image may be more convenient to obtain. In the embodiment, in addition to comparing the counted number of the switched-on light head with its historical value (such as the third threshold), it may also be compared with the counted number of other light colors, such that the error caused by accidental fluctuation of brightness can be eliminated.

According to some embodiments, prior to screening the approximately equal number of images of different light, the method 200 further includes: initiating a detection of whether the number of light color types of images annotated within a preset number range is less than the number of light heads (block S280); and issuing an alarm signal to prompt that at least one light head fails, in response to the number of light color types of images annotated within the preset number range being less than the number of the light heads (block S290). The method according to the present disclosure may recognize whether the light head of the traffic light is not switched on due to the failure while screening the image.

Figure 3:
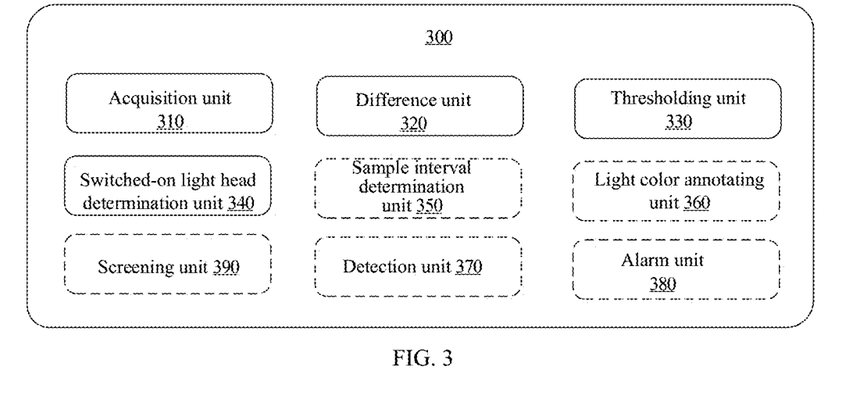
FIG. 3 is a block diagram illustrating a traffic light image processing device according to some embodiments of the present disclosure.

FIG. 3 is a block diagram of a traffic light image processing device 300 according to some embodiments of the present disclosure. Referring to FIG. 3, the device 300 may include an acquisition unit 310, a difference unit 320, a thresholding unit 330 and a switched-on light head determination unit 340. The acquisition unit 310 is configured to acquire image data of a traffic light from a roadside sensor. The image data of the traffic light includes a sequence of image frames over time, and the traffic light includes at least two light heads. The difference unit 320 is configured to perform difference processing on two temporally adjacent image frames to obtain a difference image. The pixel value of each pixel point of the difference image is equal to a difference value of corresponding pixel points of the two temporally adjacent image frames. The thresholding unit 330 is configured to perform thresholding processing on the difference image to obtain a thresholding processed difference image. The switched-on light head determination unit 340 is configured to determine the switched-on light head in the traffic light based on the thresholding processed difference image.

According to some embodiments, the thresholding unit 330 is further configured to: in response to a pixel value of a first pixel point of the difference image being greater than a first threshold, set the pixel value of the first pixel point to a preset brightness value; and in response to a pixel value of a second pixel point of the difference image being not greater than the first threshold, set the pixel value of the second pixel point to 0.

According to some embodiments, the device 300 further includes a sample interval determination unit 350. The sampling interval determination unit 350 is configured to determine a sampling interval associated with the switched-on light head to acquire an image frame to be sampled.

According to some embodiments, the device 300 further includes a light color annotating unit 360 and a screening unit 390. The light color annotating unit 360 is configured to annotate the light color to the current image according to the light color of the switched-on light head in the traffic light. The screening unit 390 is configured to screen the approximately equal number of images of different light colors according to the annotation result.

According to some embodiments, the device 300 further includes a detection unit 370 and an alarm unit 380. The detection unit 370 is configured to initiate the detection of whether the number of light color types of images annotated within a preset number range is less than the number of light heads. The alarm unit 380 is configured to issue an alarm signal to prompt that at least one light head fails, in response to the number of light color types of images annotated within the preset number range being less than the number of the light heads.

Figure 4:
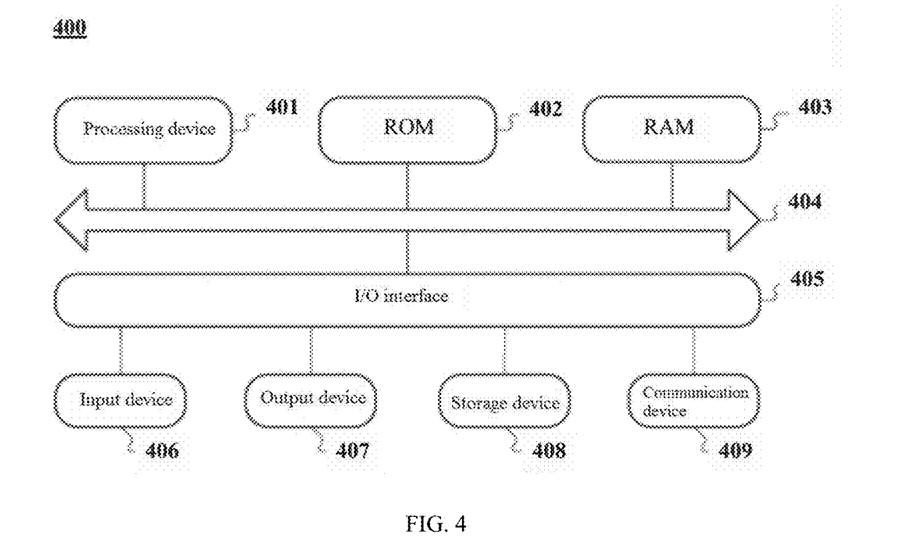
FIG. 4 is a block diagram illustrating an exemplary computer system applicable for implementing embodiments of the present disclosure.

FIG. 4 is a block diagram illustrating an exemplary computer system applicable for implementing embodiments of the present disclosure. The computer system 400 suitable for implementing embodiments of the present disclosure will be described below with reference to FIG. 4. It should be understood that the computer system 400 shown in FIG. 4 is merely an example, and should not bring any limitation on the functions and protection scope of embodiments of the present disclosure.

As shown in FIG. 4, the computer system 400 may include a processing device (such as a central processor and a graphics processor) 401 which may perform various appropriate actions and operations in accordance with the program stored in the read only memory (ROM) 402 or the program loaded into the random-access memory (RAM) 403 from a storage device 408. Various programs and data which are required for operation of the computer system 400 are further stored in the RAM 403. The processing device 401, the ROM 402 and the RAM 403 are connected to each another by a bus 404. The input/output (I/O) interface 405 is also connected to the bus 404.

Generally, the following devices may be connected to the I/O interface 405: the input device 406 such as a touch screen, a touchpad, a camera, an accelerometer and a gyroscope, the output device 407 such as a liquid crystal display (LCD), a loudspeaker and a vibrator; the storage device 408 such as a flash memory (Flash Card), and a communication device 409. The communication device 409 may allow the computer system 400 to communicate with other device in the wireless or wired manner to exchange data. While FIG. 4 shows a computer system 400 provided with various devices, it should be understood that, not all of the illustrated devices are required to be implemented or provided. More or fewer devices may alternatively be implemented or provided. Each block shown in FIG. 4 may represent a device or multiple devices as desired.

In particular, the processes described above with reference to the flowcharts may be implemented as computer software programs in accordance with the embodiments of the present disclosure. For example, embodiments of the present disclosure provide a computer readable storage medium storing a computer program including a program code for executing the method 200 shown in FIG. 2. In such embodiments, the computer program may be downloaded and installed from a network through the communication device 409, or installed from the storage device 408, or installed from the ROM 402. When the computer program is executed by the processing device 401, the functions described in the device of the embodiment of the present disclosure are realized.

It should be noted that the computer-readable medium described in the embodiment of the present disclosure may be a computer-readable signal medium or a computer-readable storage medium, or any combination thereof. The computer readable storage medium may be, for example, but is not limited to, an electronic, magnetic, optical, electromagnetic, infrared, or semiconductor system, device, or element, or a combination of any of the above. More specific examples of the computer-readable storage medium may include, but are not limited to, an electrical connector having one or more wires, a portable computer disc, a hard disk, a random-access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the above. In embodiments of the present disclosure, the computer readable storage medium may be any tangible medium including or storing programs. The programs may be used by or in connection with an instruction executed system, apparatus or device. In embodiments of the present disclosure, the computer readable signal medium may include a data signal propagating in baseband or as part of carrier wave, which carries computer readable program codes. Such propagated data signal may take any of a variety of forms, including but not limited to an electromagnetic signal, an optical signal, or any suitable combination thereof. The computer readable signal medium may also be any computer readable medium other than the computer readable storage medium, which may send, propagate, or transport programs used by or in connection with an instruction executed system, apparatus or device. The program code stored on the computer readable medium may be transmitted using any appropriate medium, including but not limited to wireless, wireline, optical fiber cable, RF, or any suitable combination thereof.

The computer-readable medium may be included in the computer system 400, and may also exist separately without being assembled into the computer system 400. The computer readable medium carries one or more programs that, when executed by computing device, cause the computer system to: acquire image data of a traffic light from a roadside sensor, the image data of the traffic light including a sequence of image frames over time, and the traffic light including at least two light heads; perform difference processing on two temporally adjacent image frames to obtain a difference image, a pixel value of each pixel point of the difference image being equal to a difference value of corresponding pixel points of the two temporally adjacent image frames; perform thresholding processing on the difference image to obtain a thresholding processed difference image; and determine a switched-on light head in the traffic light based on the thresholding processed difference image.

The computer program code for carrying out operations of embodiments of the present disclosure may be written in one or more programming languages. The programming language includes an object-oriented programming language, such as Java, Smalltalk, C++, as well as conventional procedural programming language, such as "C" language or similar programming language. The program code may be executed entirely on a user's computer, partly on the user's computer, as a separate software package, partly on the user's computer, partly on a remote computer, or entirely on the remote computer or server. In a case of the remote computer, the remote computer may be connected to the user's computer or an external computer (such as using an Internet service provider to connect over the Internet) through any kind of network, including a Local Area Network (hereafter referred to as LAN) or a Wide Area Network (hereafter referred as to WAN).

The flowcharts and block diagrams in the drawings illustrate the architecture, function and operation, which are implemented possibly, of systems, methods and computer program products according to various embodiments of the present disclosure. In this regard, each block of the flowcharts or block diagrams may represent one module, program segment, or part of code which contains one or more executable instructions for implementing the specified logical functions. It should also be noted that in some alternative implementations, the functions labeled in the block may occur out of the order labeled in the drawings. For example, two blocks shown in succession may, in fact, be executed substantially concurrently, or the blocks may sometimes be executed in the reverse order, depending upon the functions involved. It will also be noted that each block of the block diagrams and/or flowcharts and a combination of the blocks of the block diagrams and/or flowcharts may be implemented by a special hardware-based system which carries out specified functions or operations, or may be implemented by a combination of special hardware and computer instructions.

The units involved in the embodiments of the present disclosure may be implemented in software or in hardware. The described units may also be arranged in a processor, for example, it may be described as follows: a processor includes an acquisition unit, a difference unit, a thresholding unit, a switched-on light head determination unit, a sampling interval determination unit, a light color annotating unit, a screening unit, a detection unit and an alarm unit. The names of these units do not constitute the limitation on the unit itself under certain circumstances.

The roadside perception device may have the computing function as described above. For example, embodiments of the present disclosure provide a roadside device including a computer system. Specifically, the main body for executing the method according to the present disclosure may be various pieces of roadside device, such as roadside perception device with a computing function, a roadside computing device connected with the roadside perception device, a server device connected with the roadside computing device, or a server device directly connected with the roadside perception device. The server device in the present disclosure may be, for example, a cloud control platform, a vehicle-road coordination management platform, a central subsystem, an edge computing platform, a cloud computing platform and the like.

The above are only the preferred embodiments of the present disclosure and the technical principles applied thereto. It should be understood by those skilled in the art that, the protection scope involved in the embodiments of the present disclosure is not limited to the technical solutions formed by the specific combination of the above technical features, and should also cover the technical solutions made by the above technical features or their equivalents without departing from the above protection concept. For example, the above-mentioned features and the technical features disclosed in the embodiments of the present disclosure (but not limited to) with similar functions are replaced with each other to form a technical solution.

What is claimed is:

1. A method, comprising:
    acquiring image data of a traffic light from a roadside sensor, wherein the image data of the traffic light comprises a sequence of image frames over time, and the traffic light comprises at least two light heads;
    performing, using a computer processor, difference processing on two temporally adjacent image frames to obtain a difference image, wherein a pixel value of each pixel point of the difference image is equal to a difference value of corresponding pixel points of the two temporally adjacent image frames;
    performing, using the computer processor, thresholding processing on the difference image to obtain a thresholding processed difference image;
    determining, using the computer processor, a switched-on light head in the traffic light based on the thresholding processed difference image;
    annotating a light color type to a current image according to a light color of the switched-on light head in the traffic light; and
    screening an approximately equal number of images of different light color types according to the annotation result.

2. The method according to claim 1, wherein performing the thresholding processing on the difference image comprises:
    in response to a pixel value of a first pixel point of the difference image being greater than a first threshold, setting the pixel value of the first pixel point to a preset brightness value; and in response to a pixel value of a second pixel point of the difference image being not greater than the first threshold, setting the pixel value of the second pixel point to 0.

3. The method according to claim 2, further comprising: determining a sampling interval associated with the switched-on light head to acquire an image frame to be sampled.

4. The method according to claim 3, wherein determining the switched-on light head in the traffic light comprises:
calculating a sum of pixel values of pixel points of each light head in the thresholding processed difference image to obtain a difference sum of each light head;
normalizing the difference sum of each light head; and
taking a light head with a maximum normalized difference sum as the switched-on light head.

5. The method according to claim 4, wherein normalizing the difference sum of each light head comprises one of the following:
dividing the difference sum of each light head by the number of pixel points of the light head;
dividing the difference sum of each light head by the area of the light head; or
dividing the difference sum of each light head by the total area of the traffic light.

6. The method according to claim 5, wherein determining the sampling interval associated with the switched-on light head comprises:
determining that a light color of the switched-on light head in the traffic light has been switched, in response to the difference sum of the switched-on light head not satisfying at least one of:
the difference sum of the switched-on light head being greater than a product of a second threshold of a corresponding light head and a first preset percentage; and
the difference sum of the switched-on light head being greater than a product of a difference sum of at least one switched-off light head and a first preset multiple; and
determining the sampling interval as an interval between a current image frame and a latest image frame when it was determined that the light color was switched.

7. The method according to claim 6, wherein,
the second threshold is obtained by performing initialization processing on the image data of the traffic light.

8. The method according to claim 7, wherein performing initialization processing on the image data of the traffic light comprises:
performing difference processing on two temporally adjacent image frames in an initializing period to obtain a difference image;
performing thresholding processing on the difference image;
determining a maximum difference sum of the switched-on light head in the traffic light based on the thresholding processing result; and
setting the second threshold of the corresponding light head to be the maximum difference sum of the switched-on light head.

9. The method according to claim 3, wherein determining the switched-on light head in the traffic light comprises:
counting the number of pixel points set the preset brightness value in each light head; and
taking a light head including the maximum number of pixel points set the preset brightness value as the switched-on light head according to the counted number of each light head.

10. The method according to claim 9, wherein determining the sampling interval associated with the switched-on light head comprises:
determining that a light color of the switched-on light head in the traffic light is switched, in response to the counted number of the switched-on light head not satisfying at least one of:
the counted number of the switched-on light head being greater than a product of a third threshold of a corresponding light head and a second preset percentage; and
the counted number of the switched-on light head being greater than a product of a counted number of at least one switched-off light and a second preset multiple; and
determining the sampling interval as an interval between a current image frame and a latest image frame when it was determined that the light color was switched.

11. The method according to claim 1, prior to screening the approximately equal number of images of different light color types, the method further comprises:
initiating a detection of whether the number of light color types of images annotated within a preset number range is less than the number of light heads; and
issuing an alarm signal to prompt that at least one light head fails, in response to the number of light color types of images annotated within the preset number range being less than the number of the light heads.

12. The method according to claim 1, wherein the traffic light comprises a red light head, a yellow light head and a green light head.

13. A computer system, comprising:
a processor; and
a memory for storing computer programs that, when executed by the processor, cause the processor to:
acquire image data of a traffic light from a roadside sensor, wherein the image data of the traffic light comprises a sequence of image frames over time, and the traffic light comprises at least two light heads;
perform difference processing on two temporally adjacent image frames to obtain a difference image, wherein a pixel value of each pixel point of the difference image is equal to a difference value of corresponding pixel points of the two temporally adjacent image frames;
perform thresholding processing on the difference image to obtain a thresholding processed difference image;
determine a switched-on light head in the traffic light based on the thresholding processed difference image;
annotate a light color type to a current image according to a light color of the switched-on light head in the traffic light; and
screen an approximately equal number of images of different light color types according to the annotation result.

14. The computer system according to claim 13, wherein the computer programs that, when executed by the processor, further cause the processor to:
in response to a pixel value of a first pixel point of the difference image being greater than a first threshold, set the pixel value of the first pixel point to a preset brightness value; and in response to a pixel value of a second pixel point of the difference image being not greater than the first threshold, set the pixel value of the second pixel point to 0.

15. The computer system according to claim 14, wherein the computer programs that, when executed by the processor, further cause the processor to:

determine a sampling interval associated with the switched-on light head to acquire an image frame to be sampled.

16. The computer system according to claim 13, wherein the computer programs that, when executed by the processor, further cause the processor to:

initiate a detection of whether the number of light color types of images annotated within a preset number range is less than the number of light heads; and issue an alarm signal to prompt that at least one light head fails, in response to the number of light color types of images annotated within the preset number range being less than the number of the light heads.

17. A non-transitory computer-readable storage medium storing computer program instructions that, when executed by a processor, cause the processor to:

acquire image data of a traffic light from a roadside sensor, wherein the image data of the traffic light comprises a sequence of image frames over time, and the traffic light comprises at least two light heads;

perform difference processing on two temporally adjacent image frames to obtain a difference image, wherein a pixel value of each pixel point of the difference image is equal to a difference value of corresponding pixel points of the two temporally adjacent image frames;

perform thresholding processing on the difference image to obtain a thresholding processed difference image;

determine a switched-on light head in the traffic light based on the thresholding processed difference image;

annotate a light color type to a current image according to a light color of the switched-on light head in the traffic light; and screen an approximately equal number of images of different light color types according to the annotation result.

18. The non-transitory computer-readable storage medium according to claim 17, wherein the instructions that, when executed by a processor, further cause the processor to:

in response to a pixel value of a first pixel point of the difference image being greater than a first threshold, set the pixel value of the first pixel point to a preset brightness value; and in response to a pixel value of a second pixel point of the difference image being not greater than the first threshold, set the pixel value of the second pixel point to 0.

* * * * *